(12) United States Patent
Kim et al.

(10) Patent No.: US 10,418,642 B2
(45) Date of Patent: Sep. 17, 2019

(54) DEVICE AND METHOD FOR BONDING FUEL CELL PART

(71) Applicants: Hyundai Motor Company, Seoul (KR); Kia Motors Corporation, Seoul (KR)

(72) Inventors: Young Gun Kim, Seoul (KR); Sun Ho Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 15/653,006

(22) Filed: Jul. 18, 2017

(65) Prior Publication Data

US 2018/0166701 A1    Jun. 14, 2018

(30) Foreign Application Priority Data

Dec. 14, 2016    (KR) .......................... 10-2016-0170791

(51) Int. Cl.

| | | |
|---|---|---|
| *H01M 8/1004* | (2016.01) |
| *H01M 8/00* | (2016.01) |
| *B29C 65/00* | (2006.01) |
| *H01M 8/0297* | (2016.01) |
| *B29C 65/18* | (2006.01) |
| *B29C 65/78* | (2006.01) |
| *B29L 31/34* | (2006.01) |

(52) U.S. Cl.
CPC .............. *H01M 8/006* (2013.01); *B29C 66/45* (2013.01); *H01M 8/0297* (2013.01); *H01M 8/1004* (2013.01); *B29C 65/18* (2013.01); *B29C 65/7847* (2013.01); *B29C 66/1122* (2013.01); *B29C 66/472* (2013.01); *B29C 66/83221* (2013.01); *B29L 2031/3468* (2013.01); *Y02P 70/56* (2015.11)

(58) Field of Classification Search
CPC ... H01M 8/1004; H01M 8/0273; H01M 8/006
See application file for complete search history.

(56) References Cited

U.S. PATENT DOCUMENTS

| | | | | |
|---|---|---|---|---|
| 2004/0173072 A1* | 9/2004 | Ishii | ................... | H01M 4/8605 83/100 |
| 2014/0305596 A1* | 10/2014 | Ahn | ................... | H01M 8/0297 156/583.1 |

* cited by examiner

*Primary Examiner* — Olatunji A Godo

(74) *Attorney, Agent, or Firm* — Morgan, Lewis & Bockius LLP

(57) ABSTRACT

A device for bonding fuel cell parts may include a die, which forms vacuum suction holes, a lower hot press, respectively installed on both edges of a lower die to be movable in a vertical direction an upper die, installed to be movable in a vertical direction from the upper side of the lower die, a vacuum attachment member, which constitutes the same plane with the lower surface of the upper die, forms vacuum suction holes on the lower surface, and is installed on the upper die to be movable in a vertical direction while corresponding to the upper surface of the lower die between the lower hot press, and an upper hot press, respectively installed between both edges of the upper die to be movable in a vertical direction while corresponding to the lower hot press and constituting the same plane with the lower surface of the upper die.

15 Claims, 15 Drawing Sheets

DEVICE AND METHOD FOR BONDING FUEL CELL PART

CROSS-REFERENCE TO RELATED APPLICATION

The present application claims priority to Korean Patent Application No. 10-2016-0170791 filed on Dec. 14, 2016, the entire contents of which is incorporated herein for all purposes by this reference.

BACKGROUND OF THE INVENTION

Field of the Invention

The present invention relates to a system for manufacturing fuel cell parts. More particularly, the present invention relates to a device for bonding fuel cell parts that bonds a gas diffusion layer (GDL) to both sides of a membrane-electrode assembly (MEA), and a method thereof.

Description of Related Art

As is known, a fuel cell produces electricity by an electrochemical reaction between hydrogen and oxygen. Such a fuel cell is characterized in that a continuous generation is possible through the supply of chemical reactants from the outside without additional charging process.

A fuel cell may be constituted by disposing a separator (a separating plate or bipolar plate) on both sides of a membrane-electrode assembly (MEA) by placing the MEA between them. Such a fuel cell may continuously be arranged in plurality and constituted in a fuel cell stack.

The membrane-electrode assembly, which is the core part of a fuel cell according to an embodiment, forms an anode layer (a catalyst layer) on one surface of an electrolyte membrane with the electrolyte membrane placed therebetween, and forms a cathode layer (a catalyst layer) on the other surface. And gas diffusion layers (GDLs), which diffuses a reaction gas of hydrogen and oxygen, are bonded in an integrated body in each electrode layer of the membrane-electrode assembly.

The fuel cell parts, which include such a membrane-electrode assembly and a gas diffusion layer, may be prepared by bonding the gas diffusion layer to the entire surface of both surfaces of the electrode layer of the membrane-electrode assembly (hereinafter, "MEA matrix" for convenience purposes) in an integrated body.

As a method for boding the gas diffusion layer to an MEA matrix, for example, a hot press device which bonds an MEA matrix and a gas diffusion layer in an integrated body by compressing them under high temperature high pressure, in a state where the gas diffusion layers are disposed at both surface sides of the MEA matrix.

The process of bonding gas diffusion layers to both surfaces of the MEA matrix using a hot press device includes loading the lower side of the gas diffusion layer to the lower die of the hot press device, loading the MEA matrix on top of the lower side of the gas diffusion layer, loading the upper side of the gas diffusion layer on top of the MEA matrix, and then compressing the upper die to the lower die, and bonding the MEA matrix and the upper side of the gas diffusion layer at high-temperature/high-pressure.

However, in the conventional art, in a case where the upper side of the gas diffusion layer is rolled up, when the upper die of a hot press compresses the upper side of the gas diffusion layer as the upper die is lowered, the bonding position of the upper side of the gas diffusion layer with reference to the reaction surface of the MEA matrix may be distorted thereby causing a bonding error.

Additionally, in the conventional art, when an MEA matrix comes in contact with the hot region of the hot press device and the MEA matrix and the gas diffusion layer are bonded under high temperature high pressure through the hot press device prior to the bonding between the MEA matrix and the gas diffusion layer, the water contained in the MEA matrix evaporates by the heat delivered to the entire surface of the MEA matrix and thereby the MEA matrix constricts and may be modified to a wrinkled form. Such a wrinkle formation in the MEA matrix may act as causes for deteriorating the performance of a fuel cell stack during the manufacture of a fuel cell stack, such as inducing a leak of a reaction gas, etc. Furthermore, in the conventional art, the evaporation of water in the MEA matrix by the heat from the hot press device may deteriorate the ion conduction performance of the MEA matrix.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for bonding fuel cell parts and a method thereof that can embody a free loading of the upper side of the gas diffusion layer, and maintain the loading home positions of the upper side of the gas diffusion layer and the lower side of the gas diffusion layer with reference to the MEA matrix.

Additionally, various aspects of the present invention are directed to providing a device for bonding fuel cell parts and a method thereof that can prevent the shrinkage deformation due to the evaporation of water in the MEA matrix and deterioration of ion conduction performance according to the bonding between the MEA matrix and a gas diffusion layer by thermal compression.

A device for bonding fuel cell parts according to an exemplary embodiment, being for bonding the upper side of the gas diffusion layer to the upper surface of an MEA matrix and bonding the lower side of the gas diffusion layer to a lower surface of the MEA matrix, may include: i) a die, which forms vacuum suction holes on an upper surface thereof, ii) a lower hot press, which is respectively disposed on both edge portions of a lower die to be movable in a vertical direction thereof and forms the same plane with the upper surface of the lower die, iii) an upper die, which is disposed to be movable in a vertical direction thereof from the upper side of the lower die, iv) a vacuum attachment member, which forms the same plane with the lower surface of the upper die, forms vacuum suction holes on the lower surface, and is disposed on the upper die to be movable in a vertical direction thereof while corresponding to the upper surface of the lower die between the lower hot press, and v) an upper hot press, which is respectively disposed between both edge portions of the upper die to be movable in a vertical direction thereof while corresponding to the lower hot press and forms the same plane with the lower surface of the upper die.

The upper phase of the lower die and the upper phase of the lower hot press may be formed into a lower form surface while constituting the same plane.

The lower surface of the upper die, the lower surface of the vacuum attachment member, and the upper hot press may be formed into an upper form surface while constituting the same plane.

With respect to the lower form surface, the upper surface region of the lower die between the upper surfaces of the lower hot press, and the edge regions of the upper surface of the lower hot press, which correspond to each other with reference to the upper surface region placed therebetween, may be partitioned into a loading region of the upper side of the gas diffusion layer.

The vacuum attachment member may attach by vacuum to the upper side of the gas diffusion layer through the vacuum suction holes.

The lower die may attach by vacuum to the upper side of the gas diffusion layer and the lower side of the gas diffusion layer through the vacuum suction holes.

The lower hot press may include a first heating member disposed inside of the edge regions of the upper surface, which correspond to each other with reference to the upper surface region of the lower die placed therebetween.

The upper hot press may include a second heating member disposed inside of the edge regions of the lower surface, which correspond to each other with reference to the vacuum attachment member placed therebetween.

The vacuum attachment member may be disposed in the lower surface region of the upper die between the lower surfaces of the upper hot press, to be disposed in the mounting groove provided in a region of the lower surface thereof.

The lower hot press may be mounted on a guide groove formed on both edge portions of the lower die.

The upper hot press may be mounted on a guide groove formed on both edge portions of the upper die.

The upper die may be disposed to be movable in a vertical direction thereof by a driving source including a servo motor.

The vacuum attachment member may be disposed to be movable in a vertical direction thereof by a driving source including an operation cylinder provided in the upper die.

The lower hot press may be disposed to be movable in a vertical direction thereof by a driving source including an operation cylinder provided in the lower die.

The upper hot press may be disposed to be movable in a vertical direction thereof by a driving source including an operation cylinder provided in the upper die.

A method for bonding fuel cell parts according to an exemplary embodiment of the present invention, which includes bonding the upper side of the gas diffusion layer to the upper surface of an MEA matrix and bonding the lower side of the gas diffusion layer to the lower surface of the MEA matrix using the device for bonding, as described above, may include (a) a process of loading the upper side of the gas diffusion layer on the loading region of the lower die, in a state where the upper die is moved to the upper direction with respect to the lower die; (b) a process of attaching the upper side of the gas diffusion layer through a vacuum attachment member while lowering the vacuum attachment member of the upper die, and raising the vacuum attachment member; (c) a process of loading an MEA matrix on the lower side of the gas diffusion layer while loading the lower side of the gas diffusion layer on the loading region of the lower die and attaching by vacuum the lower side of the gas diffusion layer; (d) a process of loading the upper side of the gas diffusion layer on top of the MEA while lowering the vacuum attachment member; (e) a process of raising the vacuum attachment member while lowering the upper die toward the lower die; and (f) a process of compressing the MEA and both edge portions of the upper and lower diffusion layers under high temperature high pressure through the lower hot press and the upper hot press while raising the lower hot press and raising the upper hot press.

In step (a), a vacuum suction pressure may be applied to the vacuum suction holes of the lower die.

In step (b), the vacuum suction holes of the lower die may be blocked from the vacuum suction pressure.

In step (c), the lower side of the gas diffusion layer and an MEA matrix may be attached by vacuum while a vacuum suction pressure is being applied to the vacuum suction holes of the lower die.

In step (d), a vacuum suction pressure may be applied to vacuum suction holes of the vacuum suction member.

In step (e), the vacuum suction holes of the vacuum attachment member may be blocked from the vacuum suction pressure.

In step (f), the vacuum suction holes of the lower die may be blocked from the vacuum suction pressure.

In steps (a) and (e), the upper die may be raised and lowered through a servo motor.

The loading region of the lower die may include the upper surface region of the lower die between the upper surfaces of the lower hot press, and the edge regions of the upper surface of the lower hot press, which correspond to each other with reference to the upper surface region placed therebetween.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
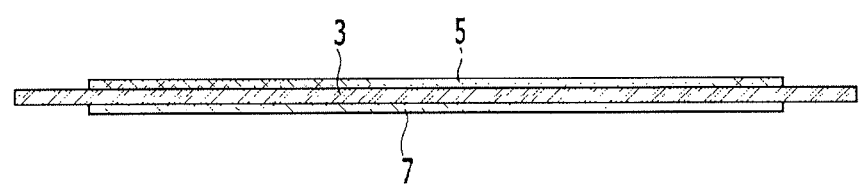
FIG. 1 is a drawing schematically illustrating fuel cell parts according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Figure 2:
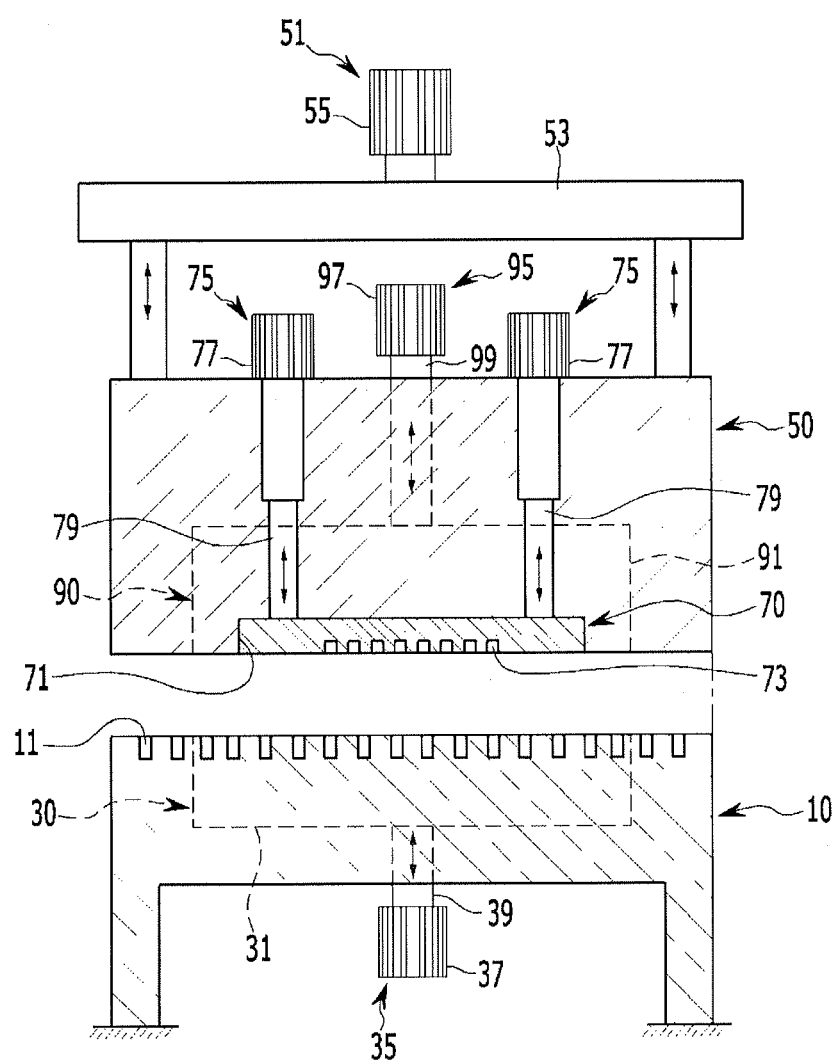
FIG. 2 is a drawing schematically illustrating a device for bonding fuel cell parts according to an exemplary embodiment of the present invention.

FIG. 1 is a drawing schematically illustrating fuel cell parts according to an exemplary embodiment of the present invention and FIG. 2 is a drawing schematically illustrating a device for bonding fuel cell parts according to an exemplary embodiment of the present invention.

Referring to FIG. 1 and FIG. 2, a device 100 for bonding fuel cell parts according to an exemplary embodiment of the present invention may be applied to a system for the automatic continuous manufacture of parts of device fuel cells constituting a fuel cell stack.

For example, the fuel cell part 1 is a core part of a fuel cell, and may be defined as a part, in which a membrane-electrode assembly (3, MEA) (hereinafter, "MEA matrix" for convenience purposes) is bonded to both sides of a gas diffusion layer (5, 7, GDL).

Hereinafter, with reference to drawings, the gas diffusion layer 5, which is to be bonded to one surface of an MEA matrix 3, is defined as an upper side of a gas diffusion layer and the gas diffusion layer 7, which is to be bonded to the other surface of the MEA matrix 3, is defined as a lower side of a gas diffusion layer.

The MEA matrix 3 forms an anode layer on one surface of an electrolyte membrane and forms a cathode layer on the other surface of the electrolyte membrane. And a sub gasket (not shown in the drawing) of a polyester polymer material for protecting each electrode layer and electrolyte membrane and securing the assembly property of a fuel cell may be bonded to the MEA matrix 3.

Here, the upper side of the gas diffusion layer 5 and the lower side of the gas diffusion layer 7 are bonded to the anode layer and the cathode layer of the MEA matrix 3, respectively. Furthermore, both edge parts of the upper side of the gas diffusion layer 5 and the lower side of the gas diffusion layer 7 are bonded to the MEA matrix 3, with reference to the MEA matrix 3 placed therebetween.

The device 100 for bonding parts of the fuel cell according to an exemplary embodiment of the present invention is for bonding the upper side of the gas diffusion layer 5 and the lower side of the gas diffusion layer 7 to the upper and lower surfaces of the MEA matrix 3 by thermal compression.

The device 100 for bonding parts of the fuel cell according to an exemplary embodiment of the present invention is formed of a structure, which can maintain the loading home position of the upper side of the gas diffusion layer 5 and the lower side of the gas diffusion layer 7 with reference to a reaction surface of the MEA matrix 3.

Additionally, in an exemplary embodiment of the present invention, there is provided a device 100 for bonding parts of the fuel cell that can prevent the shrinkage deformation due to the evaporation of water in the MEA matrix 3 and deterioration of ion conduction performance, according to the bonding between the MEA matrix 3 and gas diffusion layers 5 and 7, by thermal compression.

To this end, the device 100 for bonding parts of the fuel cell according to an exemplary embodiment of the present invention basically includes a lower die 10, a lower hot press 30, an upper die 50, a vacuum attachment member 70, and an upper hot press 90. In the above, each lower die 10 and upper die 50 may be constituted in a frame (not shown in the drawing) partitioned into one or two or more.

Figure 3:
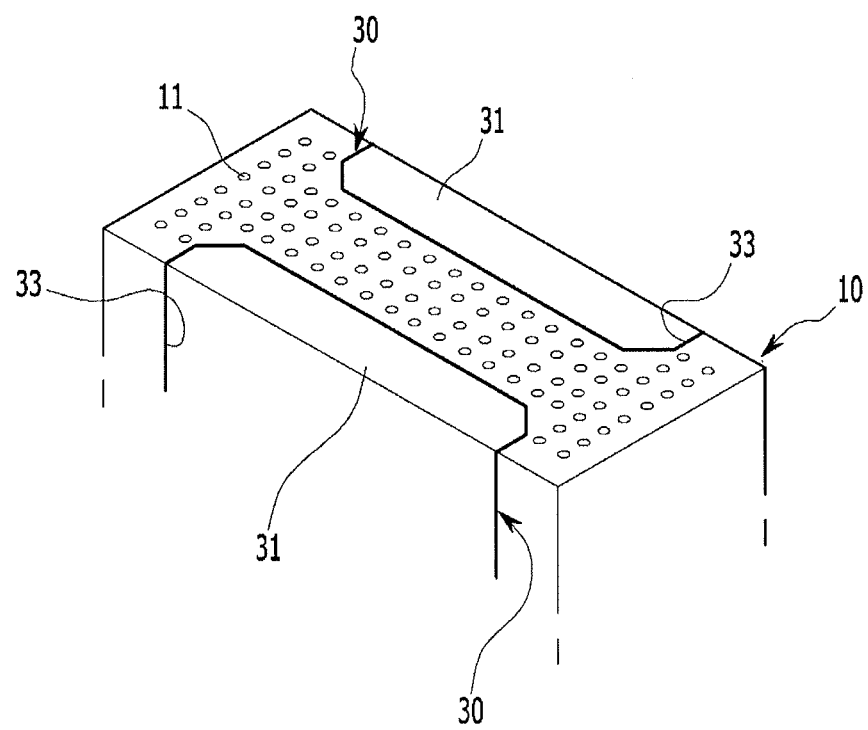
FIG. 3 is a perspective view illustrating a lower die region applied to a device for bonding fuel cell parts according to an exemplary embodiment of the present invention.

FIG. 3 is a perspective view illustrating a lower die region applied to a device for bonding fuel cell parts according to an exemplary embodiment of the present invention.

Referring to FIG. 1, FIG. 2, and FIG. 3, in an exemplary embodiment of the present invention, the lower die 10 forms vacuum suction holes 11 for the vacuum attachment of the upper side of the gas diffusion layer 5 and the lower side of the gas diffusion layer 7 by vacuum suction pressure on the upper surface. Here, the lower die 10 may be provided with accessory elements including various brackets, supporting blocks, plates, housing, cover, load, etc.

Vacuum suction pressure may be applied to the vacuum suction holes 11 by the driving of a vacuum pump, which is not shown in the drawing, and the vacuum suction pressure can be blocked by a conventional valve.

In an exemplary embodiment of the present invention, the lower hot press 30 is for bonding the lower side of the gas diffusion layer 7 to both edge portions of the lower surface of the MEA matrix 3 along with the upper hot press 90, which will be explained in detail later, by thermal compression.

The lower hot press 30 is disposed on the edge portions of both sides of the lower die 10, respectively, to be reciprocably movable in a vertical direction thereof. Here, the edge portions of both sides of the lower die 10 refer to the edge portions of both sides in the front and back direction rather than the left and right direction, with reference to the drawing.

The lower hot press 30, while its upper surface constituting the same plane with an upper surface of the lower die 10, includes a lower press block 31, which is reciprocably movable in a vertical direction thereof. The lower press block 31 is disposed on a first guide groove 33 respectively formed on both edge portions of the lower die 10 to be slidably movable in a vertical direction thereof.

The lower press block 31, in a state where an upper surface thereof forms the same plane with an upper surface of the lower die 10, can move toward the upper side direction along the first guide groove 33, and again return to the original position.

Such a lower hot press 30 reciprocates in a vertical direction thereof by a first driving source 35 which is provided in the lower die 10. For example, the first driving source 35 includes a first operating cylinder 37 that operates by pneumatic pressure or hydraulic pressure. The operating load 39 of the first operating cylinder 37 is connected to the lower press block 31.

Figure 4:
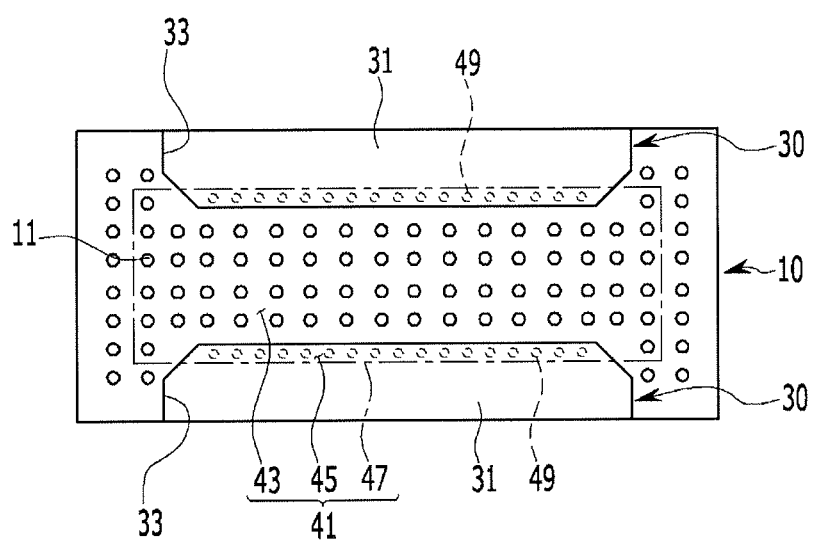
FIG. 4 is a top plan view a lower die region applied to a device for bonding fuel cell parts according to an exemplary embodiment of the present invention.

Here, the upper surface of the lower die 10 and the upper surface of the lower press block 31 forms into a lower form surface 41 while constituting the same plane as shown in FIG. 4. Such a lower form surface 41 partitions the upper surface region 43 of the lower die 10 between the upper surfaces of the lower press block 31, and the edge regions 45 of the upper surface of the lower press block 31, which correspond to each other with reference to the upper surface region 43 placed therebetween, into a loading region 47 of the upper side of the gas diffusion layer 5.

That is, the upper side of the gas diffusion layer 5 and the lower side of the gas diffusion layer 7 are loaded into the loading region 47 of the lower form surface 41. And the upper surface region 43 of the lower die 10 between the upper surfaces of the lower press block 31, and the edge regions 45 of the upper surface of the lower press block 31, which correspond to each other with reference to the upper surface region 43 placed therebetween, support the upper side of the gas diffusion layer 5 and the lower side of the gas diffusion layer 7. Furthermore, both the left and right parts of the MEA matrix 3, which are interposed between the upper side of the gas diffusion layer 5 and the lower side of the gas diffusion layer 7, may be attached by vacuum by the vacuum suction holes 11 of the lower die 10.

Meanwhile, the lower hot press 30 according to an exemplary embodiment of the present invention includes the first heating member 49 disposed inside of the edge portion region 45 of the upper surface of the lower press block 31 mentioned above.

The first heating member 49 is not disposed inside of the entire region of the upper surface of the lower press block 31 but is disposed only inside of the edge region 45 of the upper surface. The first heating member 49 is disposed inside the edge region 45 of the upper surface of the lower press block 31 along the edge direction thereof to be separated at predetermined intervals along the edge direction. For example, the first heating member 49 may include a heater rod or heater coil which generates heat by electric resistance when a power source is applied thereon.

Figure 5:
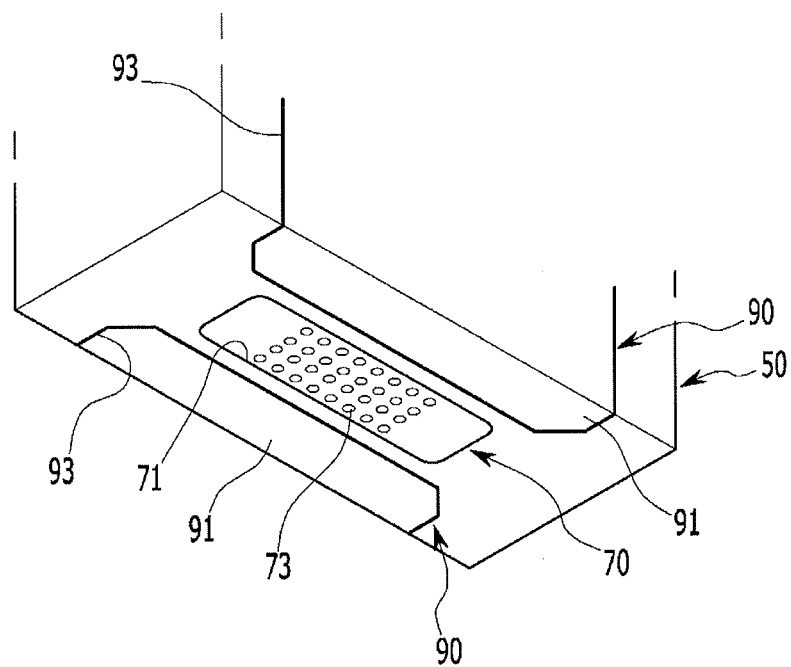
FIG. 5 is a perspective view illustrating an upper die region applied to a device for bonding fuel cell parts according to an exemplary embodiment of the present invention.

FIG. 5 is a perspective view illustrating an upper die region applied to a device for bonding fuel cell parts according to an exemplary embodiment of the present invention.

Referring to FIG. 5 along with the drawings included above, in an exemplary embodiment of the present invention, the upper die 50, being compressed to the upper surface of the lower die 10, is disposed to be reciprocably movable in a vertical direction thereof from the upper side of the lower die 10. The upper die 50 is disposed to a fixed frame 53 provided in the upper side thereof to be movable in a vertical direction thereof. The upper die 50 may be provided with accessory elements including various brackets, supporting blocks, plates, housing, cover, load, etc.

The upper die 50 is constituted to be reciprocably movable in a vertical direction from the upper side of the lower die 10 by a second driving source 51. The second driving source 51 includes a servo motor 55 to be disposed in the fixed frame 53.

And the second driving source 51 includes a power converting device (not shown in the drawing) which converts the rotational movement of the servo motor 55 into a linear reciprocating movement. For example, the power converting device may include a guide structure of a known technology provided with a lead (or ball) screw, guide rail, etc., which converts the rotational movement of the servo motor 55 into a linear reciprocating movement.

In an exemplary embodiment of the present invention, the vacuum attachment member 70 is for attaching the upper side of the diffusion layer 5, which is loaded on the loading region 47 on the lower die 10, by vacuum suction pressure.

The vacuum attachment member 70 is disposed to be reciprocably movable in a vertical direction from the lower side of the upper die 50 while corresponding to the upper surface of the lower die 10 between the lower hot press 30. That is, the vacuum attachment member 70 is disposed at the central side of the lower surface of the upper die 50, which corresponds to the upper surface of the lower die 10 between the lower hot press 30, and is disposed to be reciprocably movable in a vertical direction thereof.

The vacuum attachment member 70, while its lower surface constituting the same plane with the lower surface of the upper die 50, is disposed at the central side of the lower surface of the upper die 50. The vacuum attachment member 70 is mounted on the mounting groove 71 provided at the central side of the lower surface of the upper die 50. That is, the vacuum attachment member 70, while its lower surface constituting the same plane with the lower surface of the upper die 50, is disposed on the mounting groove 71 and may be reciprocably movable in a vertical direction thereof.

And the vacuum attachment member 70 forms, on a lower surface thereof, vacuum suction holes 73 for attaching the upper side of the gas diffusion layer 5 by vacuum suction pressure. Applied vacuum suction pressure may be applied to the vacuum suction holes 73 by the driving of a vacuum pump not shown in the drawing, and the vacuum suction pressure may be blocked by a conventional valve.

The vacuum attachment member 70, in a state where, in the mounting groove 71 of the upper die 50, a lower surface thereof and a lower surface of the upper die 50 forms the same plane, can move toward the lower side direction and again return to the original position.

To this end, the vacuum attachment member 70 is disposed to be reciprocably movable in a vertical direction thereof by a third driving source 75, which is provided in the upper die 50. For example, the third driving source 75 includes a second operating cylinder 77 operated by pneumatic pressure or hydraulic pressure. The operating load 79 of the second operating cylinder 77 is connected to the vacuum attachment member 70.

In an exemplary embodiment of the present invention, the upper hot press 90 is for bonding the upper side of the gas diffusion layer 5 to both edge portions of the upper surface of the MEA matrix 3 along with the lower hot press 30 by thermal compression.

The upper hot press 90 is respectively disposed to both edge portions of the upper die 50 to be reciprocably movable in a vertical direction thereof while corresponding to the lower hot press 30.

Here, the both edge portions of the upper die 50 refer to both edge parts in the front and back direction rather than the left and right direction, with reference to the drawing.

The upper hot press 90, while its lower surface constituting the same plane with the lower surface of the upper die 50 and the lower surface of the vacuum attachment member 70, includes an upper press block 91 which is reciprocably movable in a vertical direction thereof. The upper press block 91 is disposed on both edges of the upper die 50 with reference to the vacuum attachment member 70 placed therebetween. That is, the vacuum attachment member 70 is disposed at the lower surface region of the upper die 50 between the lower surface of the upper press block 91.

The upper press block 91 is disposed on the second guide groove 93 respectively formed on both edge portions of the upper die 50 to be slidably movable in a vertical direction thereof. The upper press block 91, in a state where a lower surface thereof forms the same plane with the lower surface of the vacuum attachment member 70, can move toward the lower side direction along the second guide groove 93 and again return to its original position.

Such an upper hot press 90 moves in a vertical direction thereof by a fourth driving source 95 provided in the upper die 50. For example, the fourth driving source 95 includes a third operating cylinder 97 which operated by a pneumatic pressure or hydraulic pressure. An operating load 99 of the third operating load 97 is connected to the upper press block 91.

Figure 6:
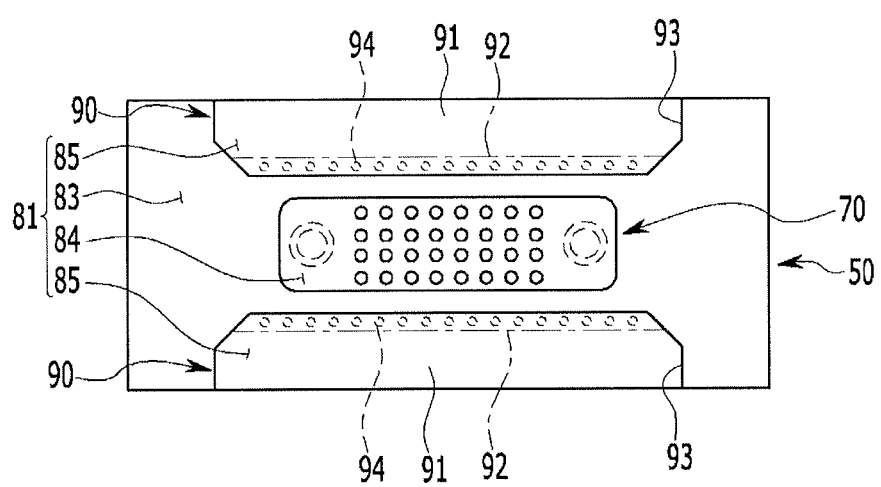
FIG. 6 is a top plan view an upper die region applied to a device for bonding fuel cell parts according to an exemplary embodiment of the present invention.

Here, a lower surface 83 of the upper die 50, a lower surface 84 of the vacuum attachment member 70, and a lower surface 85 of the upper hot press 90 form the same plane, as shown in FIG. 6, and is formed into an upper form surface 81. The upper form surface 81 supports the upper side of the gas diffusion layer 5 and the lower side of the gas diffusion layer 7 loaded onto the lower die 10 and the MEA matrix 3 loaded between them, and compresses them.

Meanwhile, the upper hot press 90 according to an exemplary embodiment of the present invention includes a second heating member 94, which is disposed inside the lower surface edge region 92 of the upper press block 91 in an upper form surface 81, with reference to the vacuum attachment member 70 placed therebetween.

The second heating member 94 is not disposed inside of the entire region of the lower surface of the upper press block 91 but is disposed only inside of the edge region 92 of the lower surface. The second heating member 94 is disposed inside of the edge region 92 of the lower surface of the upper press block 91 along the edge direction thereof to be separated at predetermined intervals. For example, the second heating member 94 may include a heater rod or heater coil which generates heat by electric resistance when a power source is applied thereon.

Hereinafter, the device 100 for bonding fuel cell parts constituted as described above according to an exemplary embodiment of the present invention and the method for bonding fuel cell parts using the operation of the device 100 for bonding the fuel cell parts are explained in detail with reference to the drawings included above and accompanying drawings.

FIG. 7, FIG. 8, FIG. 9, FIG. 10, FIG. 11, FIG. 12, FIG. 13, FIG. 14, and FIG. 15 are drawings illustrating methods for boding fuel cell parts according to exemplary embodiments of the present invention.

Figure 7:
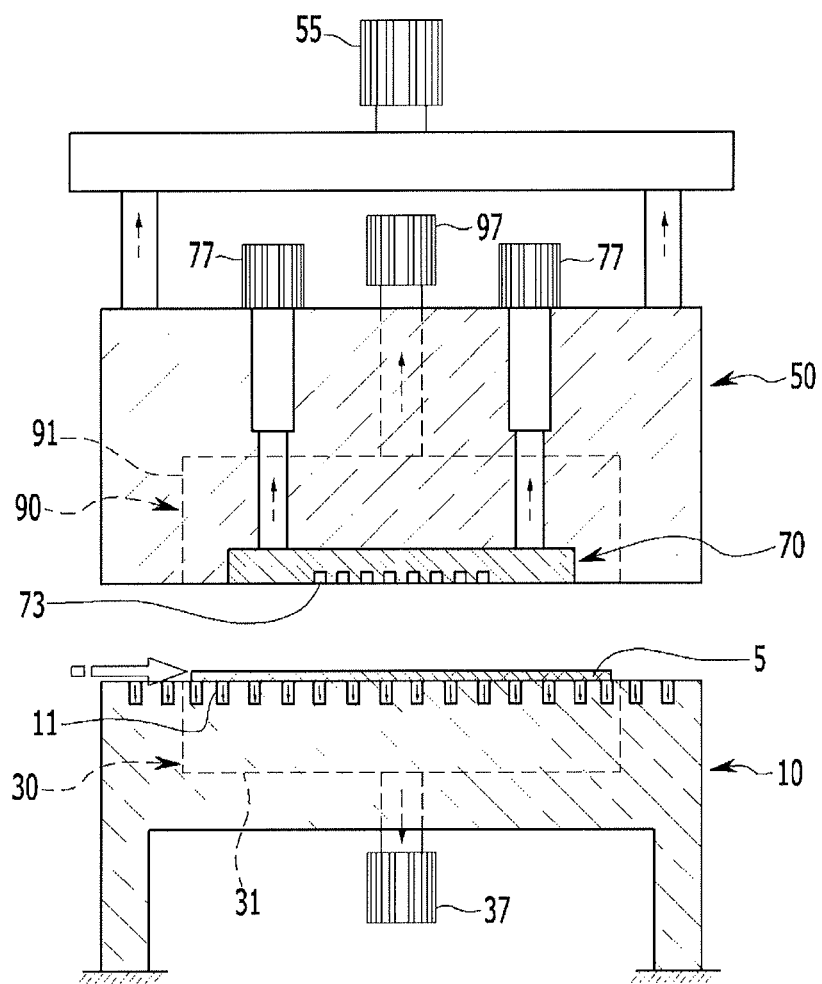
FIG. 7, FIG. 8, FIG. 9, FIG. 10, FIG. 11, FIG. 12, FIG. 13, FIG. 14, and FIG. 15 are drawings illustrating methods for boding fuel cell parts according to exemplary embodiments of the present invention.

Referring to FIG. 7, first in the lower die 10, the lower press block 31 of the lower hot press 30 is in a descended state by the reverse operation of the first operation cylinder 37. Here, the upper surface of the lower die 10 and the upper surface of the lower press block 31 form the same plane and form a lower form surface 41, and a vacuum suction pressure is acting on the vacuum suction holes 11 of the lower die 10 by a vacuum pump (not shown in the drawing).

And, the upper die 50 is an ascended state with reference to the lower die 10 as the operation of the servo motor 55, and in the upper die 50, the vacuum attachment member 70 is in an ascended state as a reverse operation of the second operation cylinder 77. Additionally, in the upper die 50, the upper press block 91 of the upper hot press 90 is in an ascended state as a reverse operation of the third operation cylinder 97. In the instant case, the lower surface 83 of the upper die, the lower surface 84 of the vacuum attachment member 70, and the lower surface 85 of the upper hot press 90 form an upper form surface 81 while constituting the same plane, and with regard to the vacuum suction holes 73 of the vacuum attachment member 70 are blocked from the vacuum suction pressure.

In such a state, according to an exemplary embodiment of the present invention, the upper side of the gas diffusion layer 5 is loaded on the lower form surface 41, and the upper side of the gas diffusion layer 5 is loaded on the loading region 47 of the lower form surface 41. Here, the loading of the upper side of the gas diffusion layer 5 may be performed by a robot gripper. The upper side of the gas diffusion layer 5 is attached to the loading region 47 by vacuum suction pressure, which acts on the vacuum suction holes 11 of the lower die 10, and as such, the home position is maintained.

Figure 8:
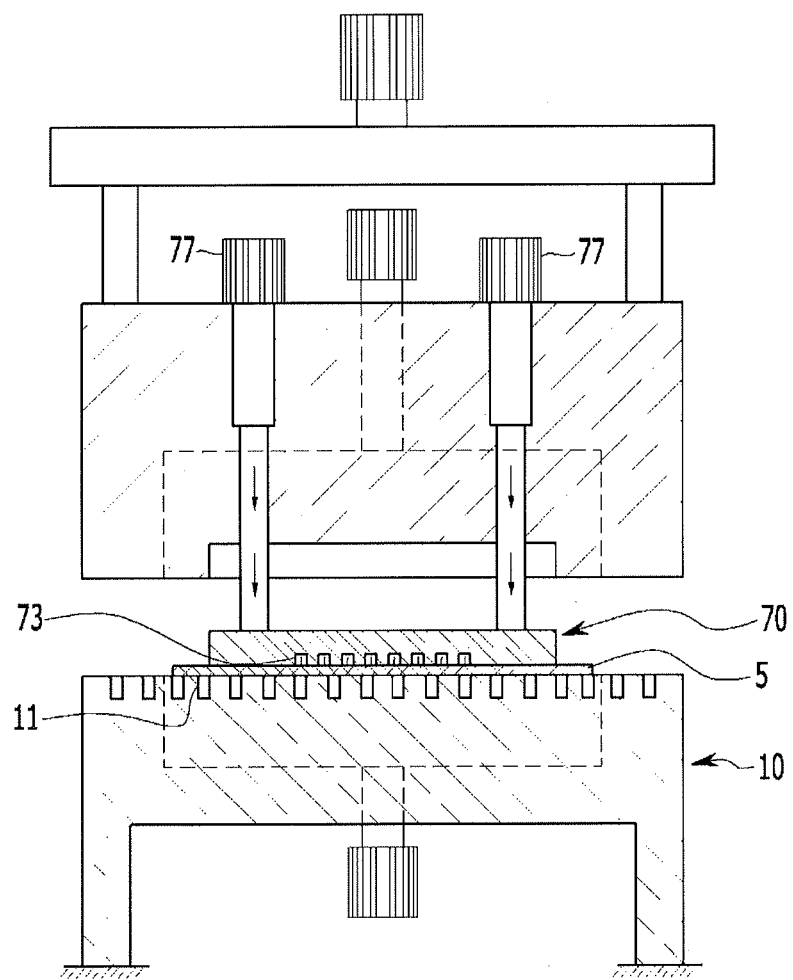

Then, in an exemplary embodiment of the present invention, as shown in FIG. 8, the vacuum attachment member 70 is lowered to a lower side direction as a forward operation of the second operation cylinder 77, and controls the upper side of the gas diffusion layer 5 on the lower die 10 through the vacuum attachment member 70.

And then, in an exemplary embodiment of the present invention, vacuum suction pressure is applied to the vacuum suction holes 73 of the vacuum attachment member 70 while simultaneously blocking the vacuum suction pressure which acts on the vacuum suction holes 11 of the lower die 10.

Figure 9:
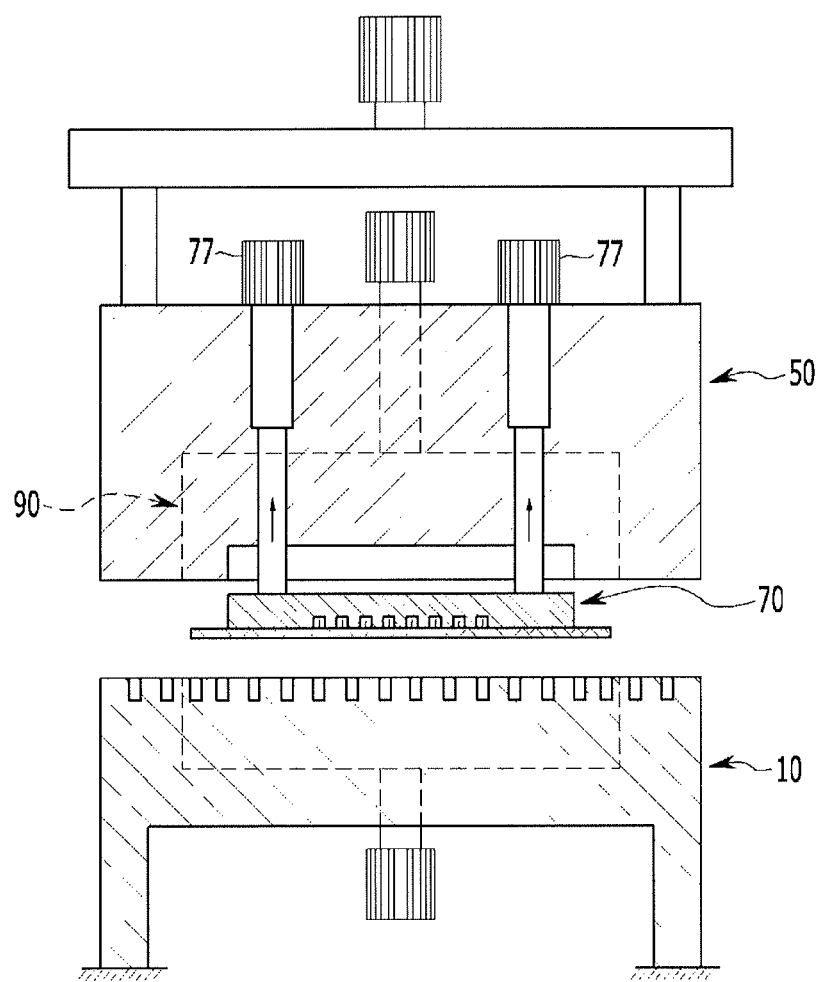

Then, in an exemplary embodiment of the present invention, as shown in FIG. 9, the vacuum attachment member 70 is raised as a reverse operation of the second operation cylinder 77. Here, in an exemplary embodiment of the present invention, as shown in the drawing, the vacuum attachment member 70 may be raised to a predetermined height between the lower die 10 and the upper die 50, or may be raised so that the lower surface of the vacuum attachment member 70 can form the same plane with the lower surface of the upper die 50 and the lower surface of the upper hot press 90.

Figure 10:
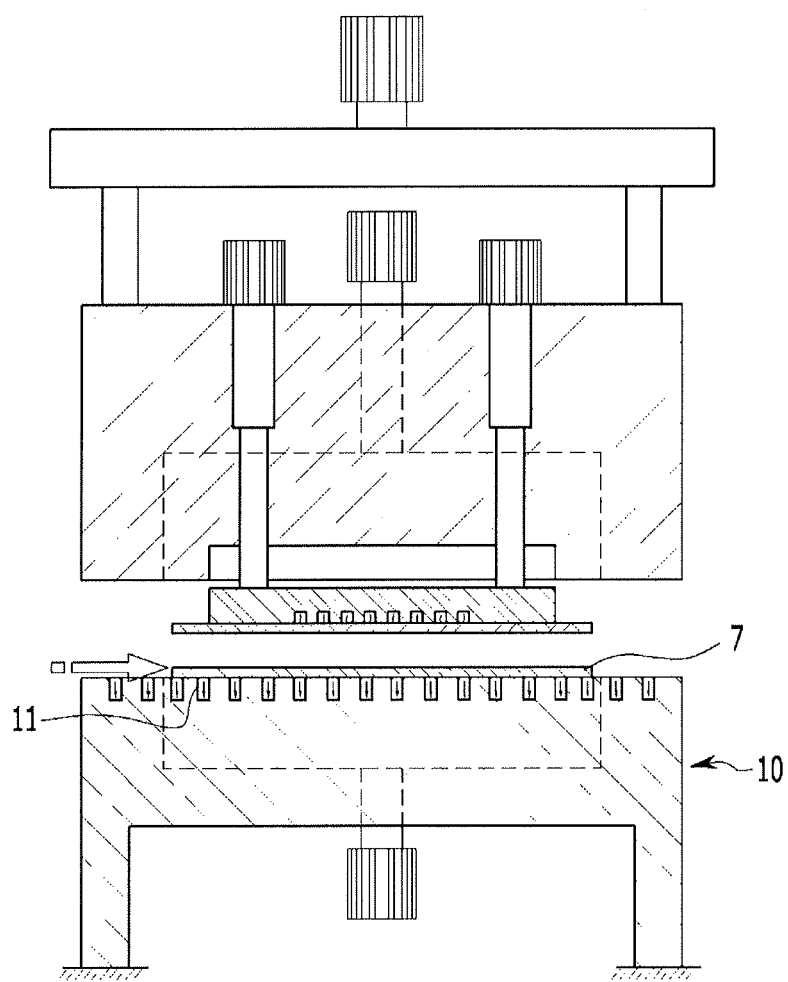

Subsequently, in an exemplary embodiment of the present invention, as shown in FIG. 10, the lower side of the gas diffusion layer 7 is loaded into the loading region 47 of the lower form surface 41, in a state where the vacuum suction pressure is applied to the vacuum suction holes 11 of the lower die 10. Here, the loading of the lower side of the gas diffusion layer 7 may be performed by a robot gripper. Then, the lower side of the gas diffusion layer 7 is attached to the loading region 47 by vacuum suction pressure, which acts on the vacuum suction holes 11 of the lower die 10, and as such, the home position is maintained.

Figure 11:
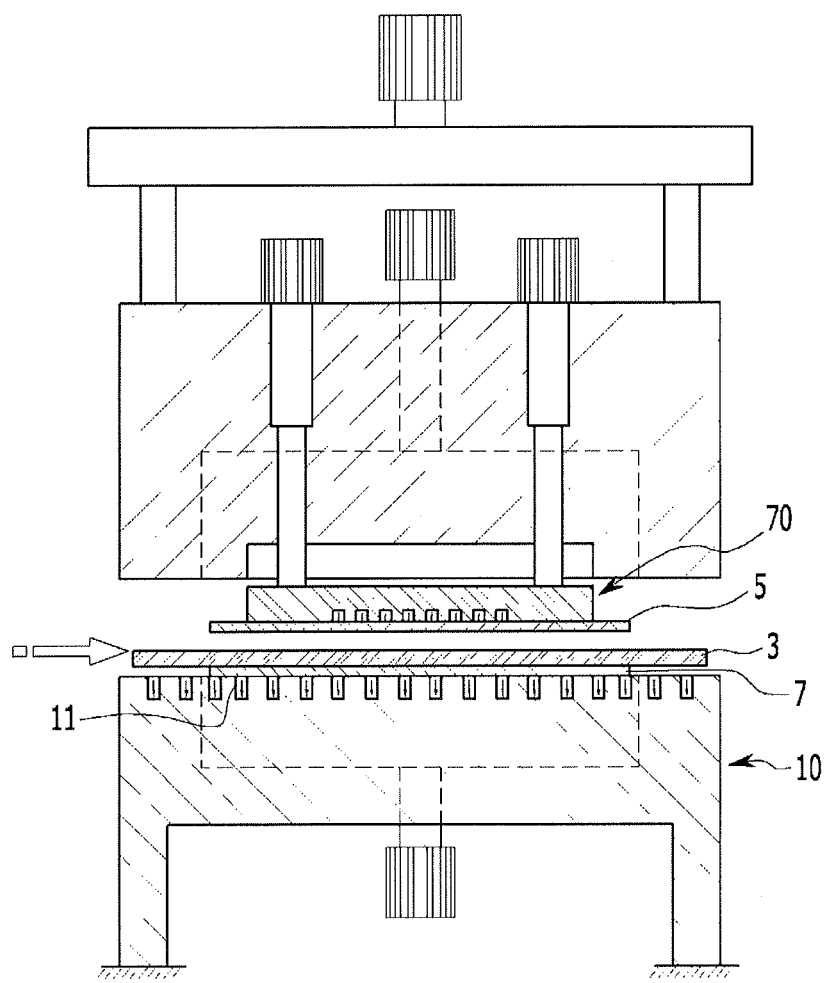

Then, in an exemplary embodiment of the present invention, as shown in FIG. 11, the MEA matrix 3 is loaded on top of the lower side of the gas diffusion layer 7, in a state where the vacuum attachment member 70 is moved to the upper side while being attached by vacuum to the upper side of the gas diffusion layer 5. Here, the loading of the MEA matrix 3 may be performed by a robot gripper.

Since the vacuum suction pressure acts on the vacuum suction holes 11 of the lower die 10 during this process, they attach by vacuum to both sides of the left and right of the MEA matrix 3 as well as to the lower side of the gas diffusion layer 7 by the vacuum suction pressure. Accordingly, the MEA matrix 3 maintains the home position on top of the lower side of the gas diffusion layer 7.

Figure 12:
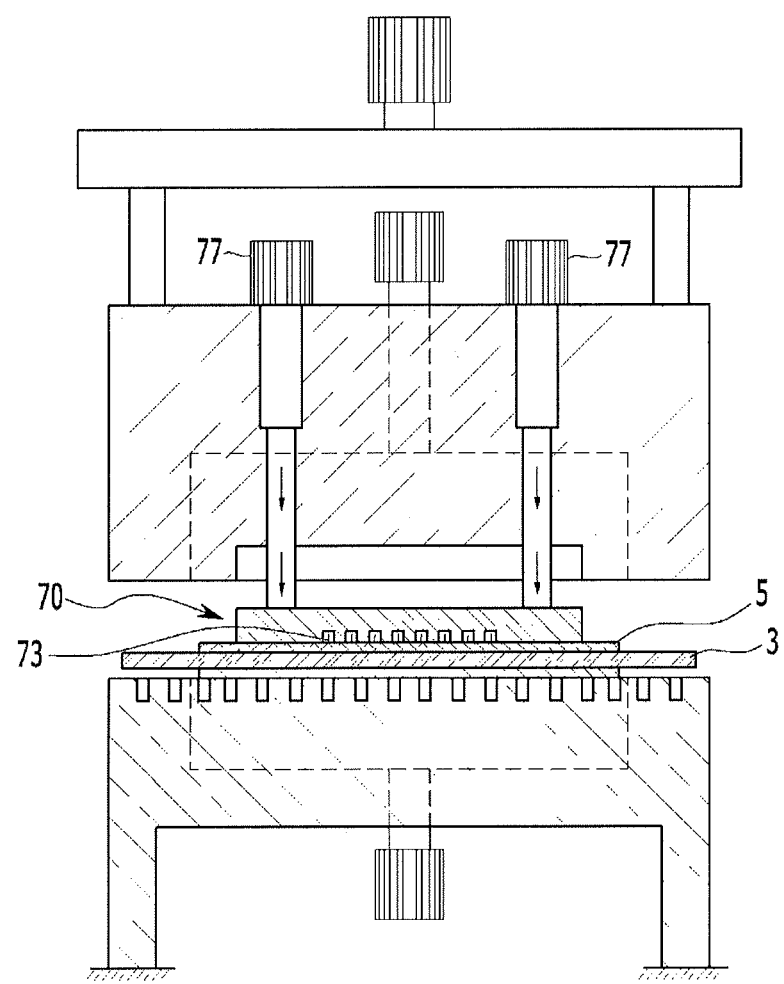

And then, in an exemplary embodiment of the present invention, as shown in FIG. 12, the upper side of the gas diffusion layer 5 is loaded on top of the MEA matrix 3 through the vacuum attachment member 70 while lowering the vacuum suction member 70 as a forward operation as a forward operation of the second operation cylinder 77.

Here, the vacuum attachment member 70 loads the upper side of the gas diffusion layer 5 on the MEA matrix 3, in a state where the upper side of the gas diffusion layer 5 is attached by vacuum by the vacuum suction pressure which acts on the vacuum suction holes 73. Here, the loading of the upper side of the gas diffusion layer 5 refers to placing the upper side of the gas diffusion layer 5 on top of the MEA matrix 3 while compressing the MEA matrix 3 through the vacuum attachment member 70.

Figure 13:
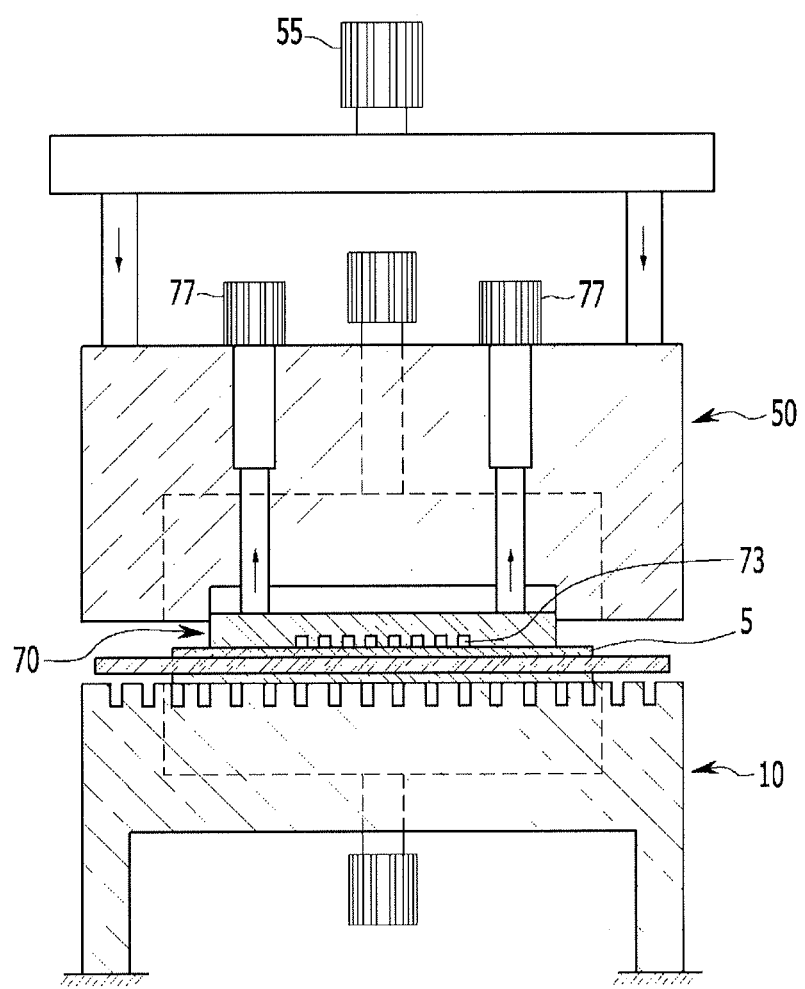

Then, in an exemplary embodiment of the present invention, as shown in FIG. 13, the vacuum attachment member 70 is raised as a reverse operation of the second operation cylinder 77 while simultaneously lowering the upper die 50 toward the lower die 10 as a driving of the servo motor 55. Here, with respect to the vacuum suction holes 73 of the vacuum attachment member 70, vacuum suction pressure is blocked.

Here, the raising of the vacuum attachment member 70 by the reverse operation of the second operating cylinder 77 does not mean that the lower surface of the vacuum attachment member 70 rises as it departs from the upper side of the gas diffusion layer 5, but it refers to a state where the second operating cylinder 77 operates reversely while simultaneously the upper die 50 is lowered, in a state where the lower surface of the vacuum attachment member 70 is in contact with the upper side of the gas diffusion layer 5.

Figure 14:
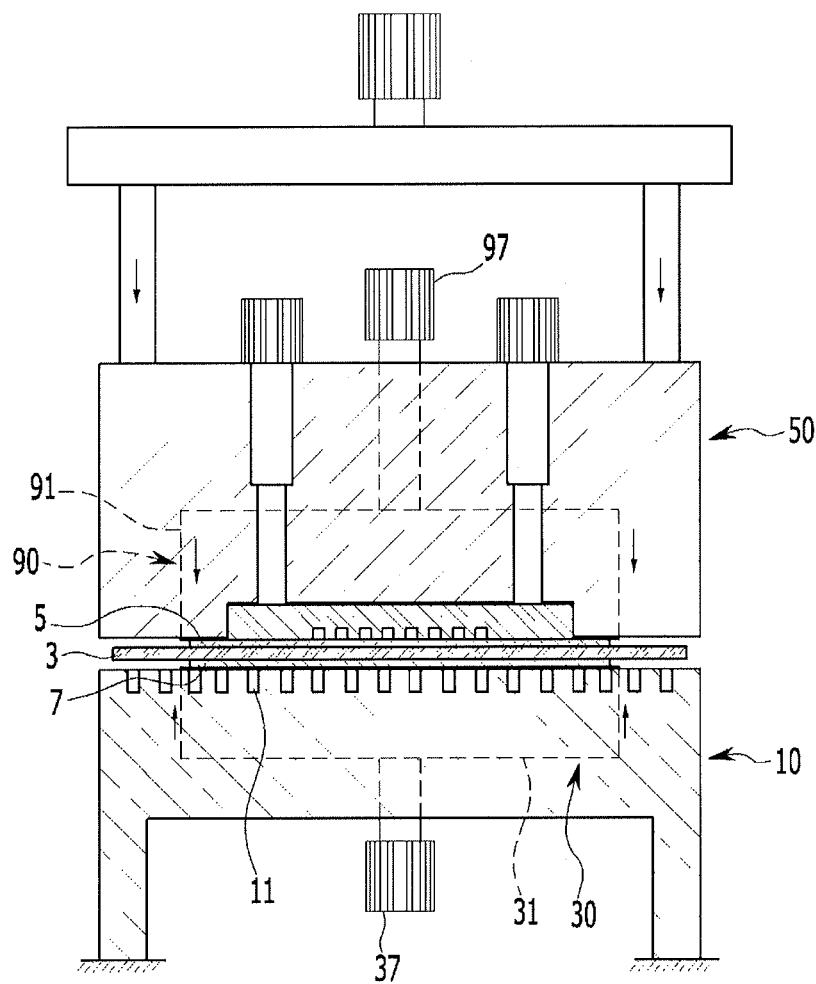

Accordingly, in an exemplary embodiment of the present invention, as shown in FIG. 14, the upper side of the gas diffusion layer 5 and the lower side of the gas diffusion layer 7, which are respectively located at upper and lower sides thereof with reference to the MEA matrix 3 placed therebetween on the lower form surface 41 of the lower die 10, are compressed toward the lower form surface 41 of the lower die 10 and the upper form surface 81 of the upper die 50.

Then, in an exemplary embodiment of the present invention, in a state where the vacuum suction pressure is blocked with regard to the vacuum suction holes 11 of the lower die 10, the lower press block 31 of the lower hot press 30 is raised as a forward operation of the first operating cylinder 37, and simultaneously, the upper press block 91 of the upper hot press 90 is lowered as a forward operation of the third operating cylinder 97.

Here, the first heating member 49 of the lower hot press 30 and the second heating member 94 of the upper hot press 90 are in a state to generate heat by electric resistance as a power source is applied thereto. Accordingly, the upper surface edge region 45 of the lower press block 31 and the lower surface edge region 92 of the upper press block 91 release heat.

Accordingly, in an exemplary embodiment of the present invention, the upper side of the gas diffusion layer 5 and the lower side of the gas diffusion layer 7, which are located upper and lower sides thereof with reference to the MEA matrix 3 placed therebetween, are compressed through the lower press block 31 and the upper hot press 90.

Accordingly, in an exemplary embodiment of the present invention, the MEA matrix 3 and both edge portions of the upper and lower gas diffusion layers 5 and 7 are compressed at high pressure and attached through the upper surface edge region 45 of the lower press block 31 and the lower surface edge region 92 of the upper press block 91.

Figure 15:
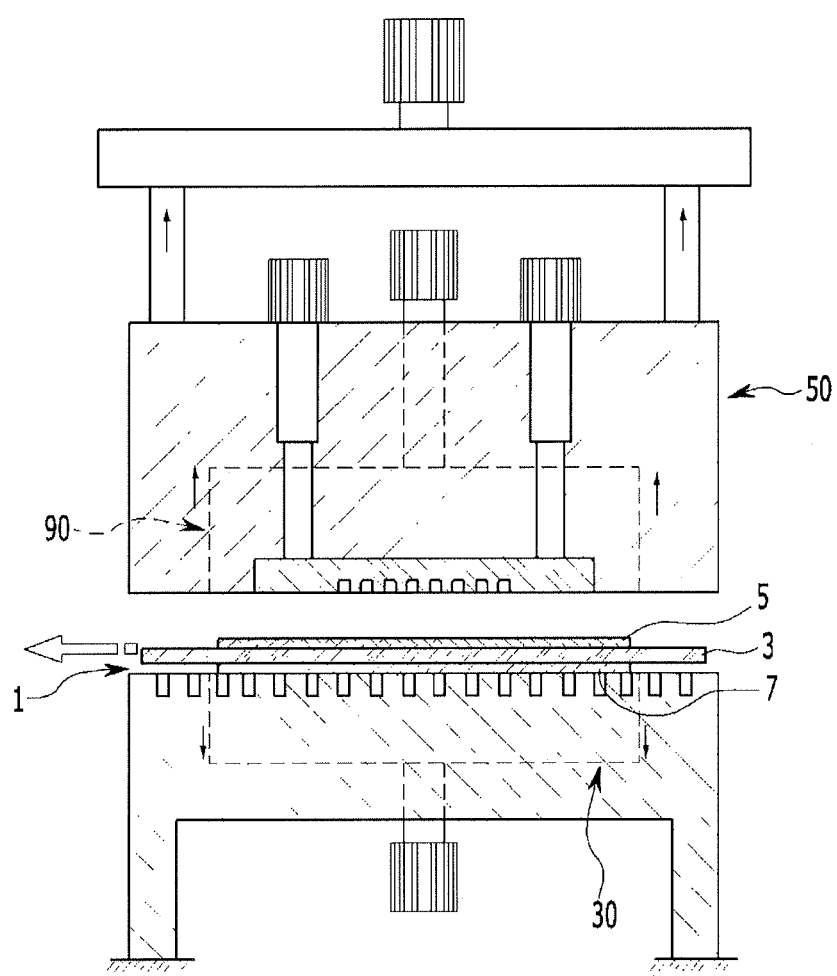

And then, in an exemplary embodiment of the present invention, as shown in FIG. 15, a fuel cell part 1 can be manufactured where the upper side of the gas diffusion layer 5 and the lower side of the gas diffusion layer 7 are bonded to both edge portions of the upper and lower surfaces of the MEA matrix 3, when the lower hot press 30 and the upper hot press 90 are returned to their original positions and the upper die 50 is raised.

According to the device 100 for bonding the fuel cell parts and a method using the device according to exemplary embodiments of the present invention as described above, the home position loading of the upper side of the gas diffusion layer 5 and the lower side of the gas diffusion layer 7 based on the reaction surface of the MEA matrix 3, can be embodied, by adopting the free loading method of the upper side of the gas diffusion layer 5 through the vacuum attachment member 70.

Accordingly, in an exemplary embodiment of the present invention, the phenomenon that the upper side of the gas diffusion layer 5 is rolled up and attached to the MEA matrix 3 in a distorted state can be prevented, and thus, the poor attachment between the MEA matrix 3 and the gas diffusion layers 5 and 7 can be minimized.

Additionally, in an exemplary embodiment of the present invention, the heat delivered to the MEA matrix 3 can be minimized by constituting the edge regions of the lower hot press 30 and the upper hot press 90 as hot regions, preventing the shrinkage deformation due to the evaporation of water in the MEA matrix 3 and deterioration of ion conduction performance of the MEA matrix 3.

Furthermore, in an exemplary embodiment of the present invention, the servo motor 55 is used as a driving source for raising and lowering the upper die 50, and thus, the cycle time of the entire bonding process can be shortened by high-speed up and down of the upper die 50.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for bonding fuel cell parts for bonding an upper side of a first gas diffusion layer on a first surface of a membrane-electrode assembly (MEA) matrix and bonding a lower side of a second gas diffusion layer on a second surface of the MEA matrix, the device comprising:
   a lower die, which forms first vacuum suction holes on an upper surface thereof;
   a lower hot press, which is respectively disposed on first and second edge portions of the lower die to be movable in a vertical direction thereof and forms a same plane with the upper surface of the lower die;
   an upper die, which is disposed to be movable in a vertical direction thereof from an upper side of the lower die;
   a vacuum attachment member, which forms a same plane with a lower surface of the upper die, forms second vacuum suction holes on the lower surface of the upper die, and is disposed on the upper die to be movable in a vertical direction thereof while corresponding to the upper surface of the lower die; and
   an upper hot press, which is respectively disposed between first and second edge portions of the upper die to be movable in a vertical direction thereof and forms a same plane with the lower surface of the upper die while corresponding to the lower hot press, wherein the upper surface of the lower die and an upper surface of the lower hot press are formed into a lower form surface while constituting a same plane;

wherein the lower surface of the upper die, a lower surface of the vacuum attachment member, and a lower surface of the upper hot press are formed into an upper form surface while constituting a same plane, wherein an upper surface region of the lower die between the upper surface of the lower hot press, and edge regions of the upper surface of the lower hot press, which correspond to each other with reference to the upper surface region disposed therebetween, are partitioned into a loading region of an upper side of the first gas diffusion layer, and wherein the vacuum attachment member attaches by vacuum to the upper side of the second gas diffusion layer through the second vacuum suction holes, and the lower die attaches by vacuum to the upper side of the second gas diffusion layer or the lower side of the first gas diffusion layer through the first vacuum suction holes.

2. The device of claim 1, wherein the lower hot press includes, a first heating member disposed inside of edge regions of the upper surface, which correspond to each other with reference to the upper surface region of the lower die disposed therebetween.

3. The device of claim 2, wherein the upper hot press includes, a second heating member disposed inside of the edge regions of the lower surface, which correspond to each other with reference to the vacuum attachment member disposed therebetween.

4. The device of claim 1, wherein the vacuum attachment member is, disposed in a lower surface region of the upper die to be disposed in a mounting groove provided in a region of the lower surface thereof.

5. The device of claim 1, wherein
the lower hot press is mounted on a guide groove formed on the first edge portion and the second edge portion of the lower die, and
the upper hot press is mounted on a guide groove formed on the first edge portion and second edge portion of the upper die.

6. The device of claim 1, wherein the upper die is disposed to be movable in a vertical direction thereof by a driving source including a servo motor.

7. The device of claim 1, wherein the vacuum attachment member is disposed to be movable in a vertical direction thereof by a driving source including an operation cylinder provided in the upper die.

8. The device of claim 1, wherein the lower hot press is disposed to be movable in a vertical direction thereof by a driving source including an operation cylinder provided in the lower die.

9. The device of claim 8, wherein the upper hot press is disposed to be movable in a vertical direction thereof by a driving source including an operation cylinder provided in the upper die.

10. A method for bonding the fuel cell parts, which includes bonding the upper side of the first gas diffusion layer to the first surface of the membrane-electrode assembly (MEA) matrix and bonding the lower side of the second gas diffusion layer to the second surface of the MEA matrix using the device for bonding of claim 1, including:
(a) a process of loading the upper side of the second gas diffusion layer on a loading region of the lower die, in a state where the upper die is moved to an upper direction with respect to the lower die;
(b) a process of attaching the upper side of the second gas diffusion layer through the vacuum attachment member while lowering the vacuum attachment member of the upper die, and then raising the vacuum attachment member,
(c) a process of loading the MEA matrix on the lower side of the first gas diffusion layer while loading the lower side of the first gas diffusion layer on the loading region of the lower die and attaching by vacuum the lower side of the first gas diffusion layer;
(d) a process of loading the upper side of the second gas diffusion layer on top of the MEA while lowering the vacuum attachment member;
(e) a process of raising the vacuum attachment member while lowering the upper die toward the lower die; and
(f) a process of compressing the MEA and the first and second edge portions of the first and second diffusion layers under high temperature and high pressure through the lower hot press and the upper hot press while raising the lower hot press and raising the upper hot press,
wherein a vacuum suction pressure is applied to the first vacuum suction holes of the lower die in step (a), and the first vacuum suction holes of the lower die are blocked from the vacuum suction pressure in step (b).

11. The method of claim 10, wherein in step (c), the lower side of the first gas diffusion layer and the MEA matrix are attached by vacuum while a vacuum suction pressure is being applied to the first vacuum suction holes of the lower die.

12. The method of claim 10, wherein
a vacuum suction pressure is applied to the second vacuum suction holes of the vacuum suction member in step (d), and
the second vacuum suction holes of the vacuum attachment member are blocked from the vacuum suction pressure in step (e).

13. The method of claim 10, wherein in step (f), the first vacuum suction holes of the lower die are blocked from a vacuum suction pressure.

14. The method of claim 10, wherein in steps (a) and (e), the upper die is raised and lowered through a servo motor.

15. The method of claim 10, wherein the loading region of the lower die includes, an upper surface region of the lower die between the upper surfaces of the lower hot press, and edge regions of the upper surface of the lower hot press, which correspond to each other with reference to the upper surface region disposed therebetween.

* * * * *